(12) United States Patent
Stuart

(10) Patent No.: US 8,788,181 B2
(45) Date of Patent: Jul. 22, 2014

(54) BI-FUEL AND DUAL-FUEL AUTOMOTIVE COMBUSTIBLE GAS DETECTION APPARATUS AND METHOD

(76) Inventor: Aaron Stuart, Layton, UT (US)

( * ) Notice: Subject to any disclaimer, the term of this patent is extended or adjusted under 35 U.S.C. 154(b) by 594 days.

(21) Appl. No.: 12/982,464

(22) Filed: Dec. 30, 2010

(65) Prior Publication Data

US 2012/0167677 A1 Jul. 5, 2012

(51) Int. Cl.
*F02D 29/02* (2006.01)

(52) U.S. Cl.
USPC ............................................. 701/108

(58) Field of Classification Search
USPC ............... 701/108, 109; 123/406.3, 406.15; 702/193
See application file for complete search history.

(56) References Cited

U.S. PATENT DOCUMENTS

| | | | | |
|---|---|---|---|---|
| 3,399,398 A * | 8/1968 | Becker et al. | ................. | 340/507 |
| 3,678,489 A * | 7/1972 | Scherban et al. | ............ | 340/511 |
| 3,815,114 A * | 6/1974 | Johnson et al. | ............... | 340/506 |
| 3,879,717 A * | 4/1975 | Gruensfelder | ................. | 340/634 |
| 3,955,186 A * | 5/1976 | Washburn et al. | ........... | 340/634 |
| 4,006,451 A * | 2/1977 | Nobile | ..................... | 340/426.25 |
| 4,098,284 A * | 7/1978 | Yamada | ......................... | 137/39 |
| 4,170,770 A * | 10/1979 | Ichinose et al. | ............... | 340/634 |
| 4,219,806 A * | 8/1980 | Enemark | ........................ | 340/632 |
| 4,223,692 A * | 9/1980 | Perry | ............................. | 340/628 |
| 4,263,928 A * | 4/1981 | Kobayashi et al. | ............ | 137/39 |
| 4,623,876 A * | 11/1986 | Shima et al. | ................ | 340/539.1 |
| 4,916,437 A * | 4/1990 | Gazzaz | .......................... | 340/632 |
| 5,229,750 A * | 7/1993 | Welch et al. | ................... | 340/605 |
| D340,200 S * | 10/1993 | Carmi | ......................... | D10/106.3 |
| 5,261,268 A * | 11/1993 | Namba | .......................... | 340/605 |
| 5,357,241 A * | 10/1994 | Welch et al. | .................. | 340/605 |
| 5,371,491 A * | 12/1994 | Wu | ................................ | 340/632 |
| 5,419,358 A * | 5/1995 | Sun | .............................. | 137/78.4 |
| 5,477,913 A * | 12/1995 | Polk et al. | .................... | 165/11.1 |
| 5,540,273 A * | 7/1996 | Polk et al. | .................... | 165/11.1 |
| 5,827,950 A * | 10/1998 | Woodbury et al. | .......... | 73/40.5 R |
| 5,838,243 A * | 11/1998 | Gallo | ............................. | 340/634 |
| 6,155,160 A * | 12/2000 | Hochbrueckner | ............ | 340/632 |
| 6,597,286 B2 * | 7/2003 | Shih et al. | .................... | 340/540 |
| 6,684,757 B2 * | 2/2004 | Petersen | ......................... | 99/332 |
| 7,055,506 B2 * | 6/2006 | Kaiser et al. | .................. | 701/103 |
| 7,342,505 B2 * | 3/2008 | Sasaki et al. | .................. | 340/632 |
| 7,717,294 B2 * | 5/2010 | Bodemann | ....................... | 222/53 |
| 7,880,625 B2 * | 2/2011 | Almoumen | .................... | 340/623 |
| 7,881,852 B2 * | 2/2011 | Heinrich et al. | ............. | 701/102 |
| 8,439,072 B2 * | 5/2013 | Bavishi, III | ............. | 137/624.11 |
| 2003/0200022 A1* | 10/2003 | Streichsbier et al. | ........ | 701/108 |
| 2012/0293333 A1* | 11/2012 | Trudel et al. | ................. | 340/632 |

* cited by examiner

*Primary Examiner* — Lisa Caputo
*Assistant Examiner* — Punam Roy
(74) *Attorney, Agent, or Firm* — Steven Rinehart

(57) ABSTRACT

An apparatus and method are disclosed for detecting a combustible fuel leakage into the cabin of a bi-fuel or dual-fuel vehicle. The apparatus comprises a box affixed inside the cabin of a bi-fuel vehicle which alerts a driver to the presence of a combustible fuel inside the cabin using an audible alarm and flashing lights, and which then either disables the vehicle or switches the fuel powering the vehicle's engine to gasoline. Certain embodiments of the present invention include substitute means of generating and transmitting alerts to drivers, as well as of manipulating vehicle function.

1 Claim, 2 Drawing Sheets

BI-FUEL AND DUAL-FUEL AUTOMOTIVE COMBUSTIBLE GAS DETECTION APPARATUS AND METHOD

BACKGROUND OF THE INVENTION

1. Field of the Invention

This invention relates to gas detection methods and apparatii, and more particularly relates to an apparatus and method for detecting combustible gases present inside the cabin of a bi-fuel automotive vehicle.

2. Description of the Related Art

Bi-fuel vehicles are known in the art, and comprise automobiles and larger commercial vehicles with multifuel engines, often retrofitted to run on two different fuels, such a gasoline and natural gas (CNG), diesel and methane, or the like. Other fuels include LPG and hydrogen. The two fuels are stored in separate fuel tanks inside the vehicle, and a driver switches back-and-forth between them manually. In some embodiments, the vehicle is configured to automatically switch between the two fuels when one fuel reaches a state of depletion. In most embodiments, the vehicle runs on one fuel at a time, but flexible-fuel vehicles ("dual-fuel") are also known in the art, which comprise engines configured to run on different fuels mixed together in the same tank.

As bi-fuel vehicles become more engrained in mainstream society, drivers face a growing number of safety, maintenance and mechanical issues unique to bi-fuel vehicles, including the possibility of combustible gases used to power the bi-fuel vehicle leaking into the cabin of the vehicle itself. Natural gas, or CNG, naturally cannot be detected by the human sense of smell, and even small quantities can combust, asphyxiate, burn or kill the bi-fuel driver and/or passengers. Other gas fuels can be equally dangerous, including methane and hydrogen.

Bi-fuel vehicles known in the art comprise no means of detecting gas leaking into the cabin of the vehicle, of alerting drivers to its presence, or of adjusting vehicle operations in response to the gas detection.

SUMMARY OF THE INVENTION

From the foregoing discussion, it should be apparent that a need exists for an apparatus and method for detecting combustible gases in a bi-fuel vehicle. The present invention has been developed in response to the present state of the art; and, in particular, in response to the problems and needs in the art that have not yet been fully solved by currently available methods, systems and apparatii, and that overcomes many or all of the above-discussed shortcomings in the art. Accordingly, the present invention has been developed to provide a bi-fuel automotive combustible gas detection apparatus and method.

The bi-fuel vehicle combustible gas detection device comprises a housing defining a hollow recess between 0.1 liters in volume and 5 liters in volume; and one or more combustible gas detector(s) affixed to the housing capable of detecting elevated levels of one or more combustible gas(es) from the group consisting of natural gas, isobutene, propane, benzene, acetylene, nitrous oxide, methane, carbon monoxide, and hydrogen; wherein the gas detector(s) comprise one or more of a laser gas detector and a thermal conductivity sensor; wherein the detectors are configured to perpetually measure levels of the combustible gas(es).

The bi-fuel vehicle also comprises one or more LED(s) affixed to one or more of the housing and combustible gas detector configured to flash in response to the measured levels of the combustible gas(es) exceeding a predetermined threshold; one or more loudspeakers configured to emit a repeating audible frequency in response to the measured levels of the combustible gas(es) exceeding a predetermined threshold; a control unit configured to send an electronic signal via a signal bearing medium to one or more electromechanical shut-off values configured to physically close a fuel line bearing a combustible gas in response to receiving the electronic signal.

The bi-fuel vehicle combustible gas detection device may further comprise one or more secondary LED(s) configured to blink in response to the measured levels of the combustible gas(es) exceeding a secondary predetermined threshold but not exceeding the predetermined threshold; wherein a color emitted by the secondary LED(s) differs from a color emitted by the LED(s).

The control unit may be in logical communication with the bi-fuel vehicle vis-à-vis one of an OBDII port and a CAN data bus; wherein the control unit is configured to activate a check engine light on the dashboard of the bi-fuel vehicle in response to measured levels of the combustible gas(es) exceeding a secondary threshold but not exceeding the predetermined threshold.

The bi-fuel vehicle combustible gas detection device may further comprise an override button, which, when depressed, opens the shut off valve(s) and deactivates one or more of the LED(s) and the loudspeaker.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. The apparatus modules recited in the claims may be configured to impart the recited functionality to the apparatus. The teachings of the present invention apply to dual-fuel vehicles as they do to bi-fuel vehicles.

Figure 1:
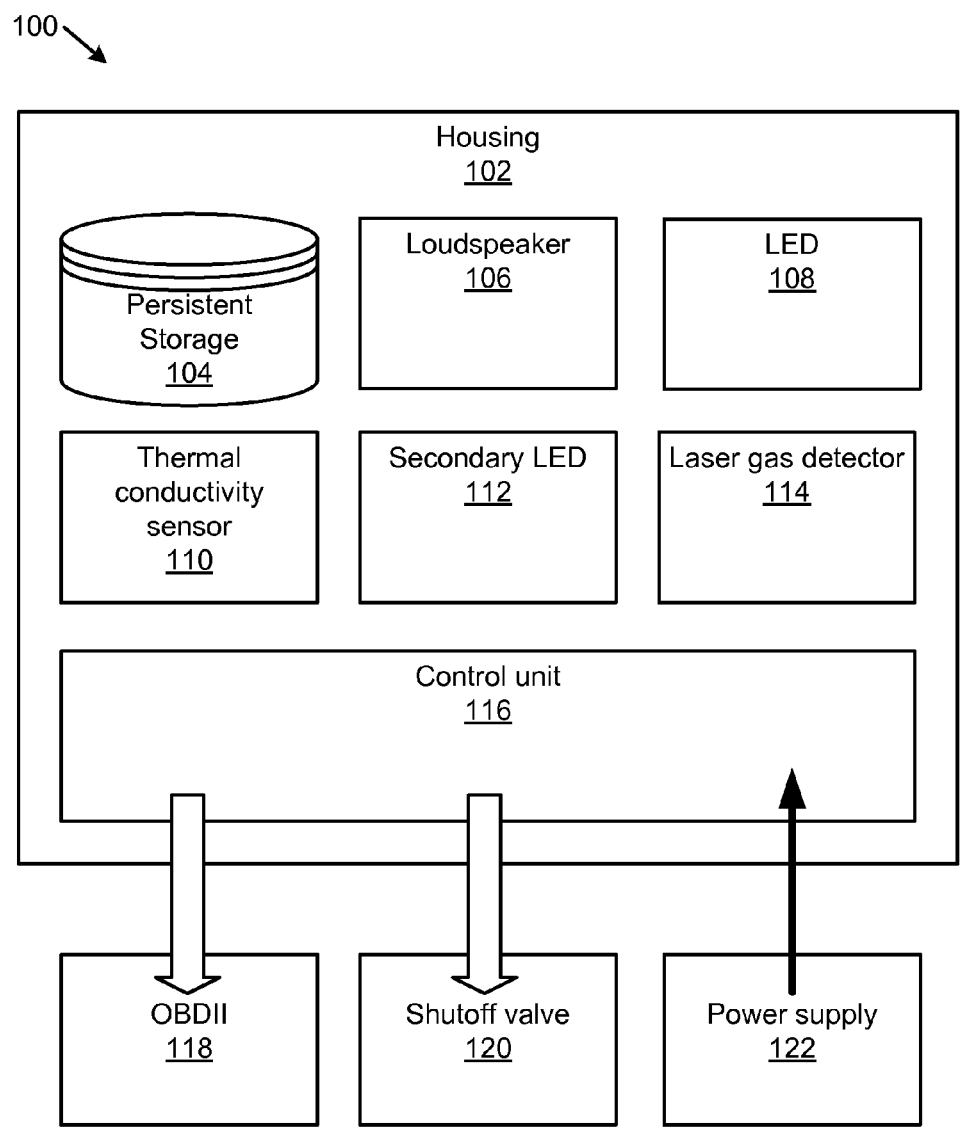
FIG. 1 is a block diagram illustrating another embodiment of bi-fuel vehicle combustible gas detection device in accordance with the present invention.

FIG. 1 is a block diagram illustrating another embodiment of bi-fuel vehicle combustible gas detection device 100 in accordance with the present invention. The apparatus 100 comprises a housing 102, persistent storage 104, a loudspeaker 106, an LED 108, a thermal conductivity sensor 110, a secondary LED 112, a laser gas detector 114, and a control unit 116. Also shown are an OBDII port 118, a shutoff value 120, and a power supply 122.

The housing 102 comprises an alloy and/or resin and/or polymer and/or wood unit defining a hollow interior. The interior consists of a hollow recess within the housing 102 which, in some embodiments, houses the other components of the device 100, including sensors in whole or in part described below.

The housing 102 may be cubic in shape, conical, cylindrical, spherical, hemispherical, or any other geometric shape with an interior volume of 0.1 liters to 10 liters.

The loudspeaker 106 is well-known to those of skill in the art, and may include a buzzer. The loudspeaker 106 is activated by the control unit 116 when the measured amount of one or more combustible gas(es) exceeds a predetermined threshold.

The LED 108 is well-known to those of skill in the art. The LED 108 is activated by the control unit 116 when the measured amount of one or more combustible gas(es) exceeds a predetermined threshold.

The predetermined threshold is set by a third-party before the device 100 is installed. The predetermined threshold is a measurement of the maximum acceptable level of one or more combustible gases, above which either: the gases pose some unacceptable danger or poisoning or combusting; or above which the presence of the combustible gases poses some unacceptable likelihood that the bi-fuel vehicle is hemorrhaging gas from the fuel lines into the cabin of the bi-fuel vehicle.

The secondary predetermined threshold, like the predetermined threshold, comprises the level above which the measured combustible gases are thought to be entering an abnormal range but not becoming dangerous or necessarily indicative of a fuel leak.

The predetermined threshold, and secondary predetermined threshold, are stored as variables in firmware or persistent storage 104. In some embodiments of the present invention, the driver sets the predetermined threshold and secondary predetermined threshold.

The device 100 comprises, in the shown embodiment, one or more sensors for measuring the levels of one or more combustible gases in the cabin of the bi-fuel vehicle, including any sensors well-known to those of skill in the art.

The one or more combustible gas detector(s), or sensor(s), affixed to the housing are capable of detecting elevated levels of one or more combustible gas(es) from the group consisting of natural gas, isobutene, propane, benzene, acetylene, nitrous oxide, methane, carbon monoxide, and hydrogen; wherein the gas detector(s) comprise one or more of a laser gas detector and a thermal conductivity sensor; wherein the detectors are configured to perpetually measure levels of the combustible gas(es).

Laser gas detectors and thermal conductivity sensors are known to those of skill in the art.

In some embodiments, the driver of the vehicle may override the control unit, the LED(s) 108, the secondary LED(s) 112, and the loudspeaker 106 and reopen closed shutoff valves 120 by depressing an override button on the housing 102.

Those of skill in the art recognize that the device 100 may be more simple or complex than illustrated so long as the device 100 includes modules, components or sub-systems that correspond to those described herein. The device 100 and control unit 116 may comprise a computer program running on one or more data processing devices (DPDs), such as a server, computer workstation, router, mainframe computer, or the like. In various embodiments, the DPD comprises one or more processors. The processor is a computing device well-known to those in the art and may include an application-specific integrated circuit ("ASIC").

Typically, the control united comprises one or more central processing units executing software and/or firmware to control and manage the other components within the device 100. In one embodiment, the control unit 116 comprises hardware and/or software more commonly referred to as a Multiple Virtual Storage (MVS), OS/390, zSeries/Operating System (z/OS), UNIX, Linux, or Windows system 100.

In the shown embodiment, the server 102 creates contest records 116 from information gathered telephonically from a contestant 110 communicating with the server 102 wirelessly through an SMS Gateway Provider 104 using a Short Message Service (SMS) or Multimedia Message Service (MMS) message.

The control unit 116 may communicate wireless with one or more components of the bi-fuel vehicle using means known those of skill in the art transmitting combustible gas measurement data via the bi-fuel vehicle to a third-party DPD tracking historical combustible gas data. The control unit 116 may be in logical communication with the bi-fuel vehicle through a networked environment, such as local area network (LAN) or wide area network (WAN). Alternatively, the control unit 116 may communicate via cable directly with third-party DPD using variation of the using Simple Mail Transfer Protocol (SMTP), Internet Message Access Protocol (IMAP), Post Office Protocol (POP), or other protocols well-known to those of skill in the art.

In alternative embodiments, the control unit 116 communicates wirelessly with other wireless personal DPDs such as laptops, Palm Pilots®, GPS signaling devices, and the like.

The control unit 116 may communicate with the UBDII port of the bi-fuel vehicle and/or a CAN data bus on the bi-fuel vehicle. The control unite 116 may also send electronic signals over a signal bearing medium to shut off valves on the bi-fuel vehicle's fuel lines opening or closing the fuel lines.

The persistent storage 104 provides persistent storage of data. In particular, the persistent storage 104 stores computer readable database files which store historical measurements of the combustible gas. In the shown embodiment, the persistent storage 104 is in logical communication with the control unit 116.

The device 100 may comprise other types of sensors and measurement modules, including a GPS sensor, a thermometer, a clock, an altimeter, an oxygen sensor, and the like. The GPS sensor measures GPS data comprising Global Positioning System (GPS) information identifying the bi-fuel vehicle's physical location.

Figure 2:
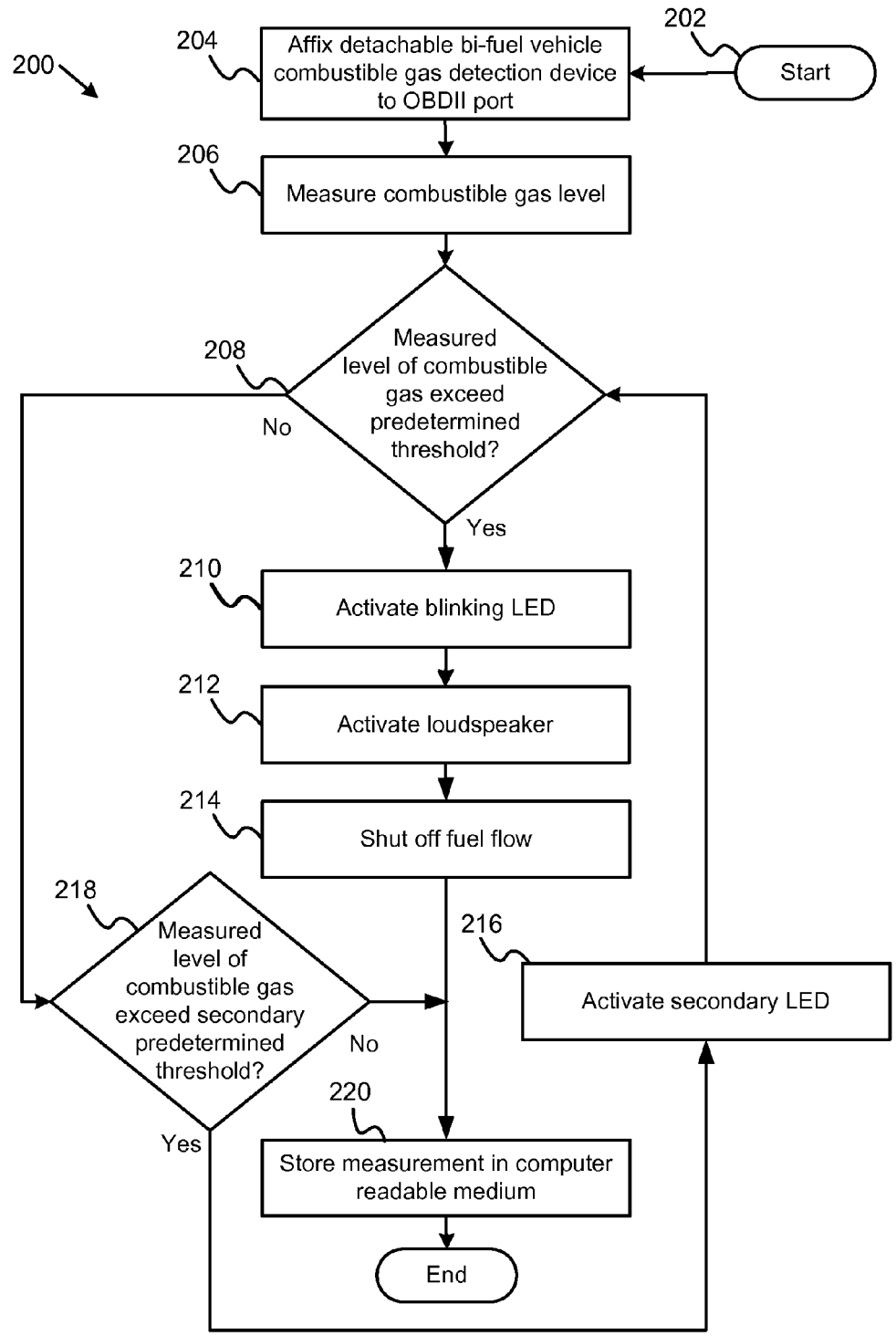
FIG. 2 is a flow chart of a method of detecting combustible gas in the cabin of a bi-fuel vehicle in accordance with the present invention.

FIG. 2 is a flow chart of a method of detecting combustible gas in the cabin of a bi-fuel vehicle in accordance with the present invention.

The method begins 202 and progresses as shown.

At step 220, measurements of the combustible gas are saved in computer read storage, such as the persistent storage 104. The measurements are saved in computer readable files called event files, which comprise a timestamp, measurement data of the combustible gas, GPS coordinates, and/or measurement data of the ambient air in the cabin, including temperature, oxygen levels, pressure, and the like. The event files stored in persistent storage 104 may serialized numerically, as hash codes and/or in a hash table, or through other methods, with the serialization formatted in persistent storage 104 in database columns. The event files may be retrieved via computer by accessing the persistent storage 104 via a USB port affixed to the housing 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A bi-fuel vehicle combustible gas detection device comprising:

a housing defining a hollow recess between 0.1 liters in volume and 5 liters in volume;

one or more combustible gas detector(s) affixed to the housing capable of detecting elevated levels of one or more combustible gas(es) from the group consisting of natural gas, isobutene, propane, benzene, acetylene, nitrous oxide, methane, carbon monoxide, and hydrogen; wherein the gas detector(s) comprise one or more of a laser gas detector and a thermal conductivity sensor; wherein the detectors are configured to measure levels of the combustible gas(es);

one or more LED(s) affixed to one or more of the housing and combustible gas detector configured to flash in response to the measured levels of the combustible gas (es) exceeding a predetermined threshold;

one or more loudspeakers configured to emit a repeating audible frequency in response to the measured levels of the combustible gas(es) exceeding a predetermined threshold;

a control unit configured to send an electronic signal via a signal bearing medium to one or more electromechanical shut-off valves configured to physically close a fuel line bearing a combustible gas in response to receiving the electronic signal; and wherein the control unit is in logical communication with the bi-fuel vehicle vis-à-vis one of an OBDII port and CAN data bus; wherein the control unit is configured to activate a check engine light on the dashboard of the bi-fuel vehicle in response to measured levels of the combustible gas(es) exceeding a secondary threshold but not exceeding the predetermined threshold.

* * * * *